(12) United States Patent
Nakano et al.

(10) Patent No.: US 11,577,745 B2
(45) Date of Patent: Feb. 14, 2023

(54) INFORMATION PROCESSING DEVICE, INFORMATION PROCESSING METHOD, AND STORAGE MEDIUM STORING INFORMATION PROCESSING PROGRAM

(71) Applicant: TOYOTA JIDOSHA KABUSHIKI KAISHA, Toyota (JP)

(72) Inventors: Keiko Nakano, Kawasaki (JP); Eiichi Maeda, Itabashi-ku (JP); Chikage Kubo, Chofu (JP); Hiroyuki Nishizawa, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 129 days.

(21) Appl. No.: 17/143,321

(22) Filed: Jan. 7, 2021

(65) Prior Publication Data
US 2021/0237757 A1    Aug. 5, 2021

(30) Foreign Application Priority Data

Jan. 31, 2020 (JP) .............................. JP2020-015668

(51) Int. Cl.
*B60W 50/14* (2020.01)
*G10L 15/22* (2006.01)
(Continued)

(52) U.S. Cl.
CPC ......... *B60W 50/14* (2013.01); *G06F 16/3329* (2019.01); *G10L 15/22* (2013.01); *B60W 2050/146* (2013.01); *B60W 2540/21* (2020.02); *G06N 20/00* (2019.01); *G10L 2015/223* (2013.01)

(58) Field of Classification Search
None
See application file for complete search history.

(56) References Cited

U.S. PATENT DOCUMENTS 8,022,831 B1 * 9/2011 Wood-Eyre ............... B60T 7/14
340/576
8,758,126 B2 * 6/2014 Bavitz .................... A63F 13/217
463/31
(Continued)

FOREIGN PATENT DOCUMENTS

BR    112014009256 B1 * 10/2021 ............. B60R 16/03
CA       3064116 A1 *  6/2020 ............. G06F 3/167
(Continued)

*Primary Examiner* — Kevin R Steckbauer
(74) *Attorney, Agent, or Firm* — Oblon, McClelland, Maier & Neustadt, L.L.P.

(57) ABSTRACT

An information processing device acquires question information. The information processing device acquires vehicle state information representing a state of the vehicle. The information processing device acquires answer information in response to the question information, the answer information including an image for display. The information processing device, in a case in which the vehicle state information represents that the vehicle is traveling, stores the answer information in a storage. The information processing device, in a case in which the information processing device acquires vehicle state information representing that the vehicle is stopped, outputs the answer information stored in the storage.

7 Claims, 11 Drawing Sheets

(51) Int. Cl.
*G06F 16/332* (2019.01)
*G06N 20/00* (2019.01)

(56) References Cited

U.S. PATENT DOCUMENTS

| | | | |
|---|---|---|---|
| 8,758,127 B2* | 6/2014 | Wang | A63F 13/00 |
| | | | 463/31 |
| 8,793,033 B2* | 7/2014 | Schuerman | G01S 19/14 |
| | | | 701/1 |
| 8,948,931 B2* | 2/2015 | Kowada | B60R 16/03 |
| | | | 340/540 |
| 9,105,034 B2* | 8/2015 | Hamilton, II | G06Q 30/02 |
| 9,266,018 B2* | 2/2016 | Story, Jr. | A63F 9/24 |
| 9,327,189 B2* | 5/2016 | Bavitz | A63F 13/65 |
| 10,175,865 B2* | 1/2019 | Beaver | G06F 40/30 |
| 10,318,978 B2* | 6/2019 | Hamilton, II | G06Q 30/02 |
| 10,418,023 B2* | 9/2019 | Jiang | G10L 13/047 |
| 10,446,145 B2* | 10/2019 | Kim | G10L 15/22 |
| 10,545,648 B2* | 1/2020 | Beaver | G06F 3/04842 |
| 10,755,711 B2* | 8/2020 | Oikawa | G10L 15/22 |
| 10,789,944 B2* | 9/2020 | Siva Kumaran | G06N 20/00 |
| 10,997,373 B2* | 5/2021 | Bhowal | G06F 40/56 |
| 11,030,990 B2* | 6/2021 | Jiang | G10L 13/047 |
| 11,225,258 B2* | 1/2022 | Matsunami | B60Q 1/52 |
| 11,295,727 B2* | 4/2022 | Mei | H04L 51/02 |
| 2012/0246008 A1* | 9/2012 | Hamilton, II | G06Q 30/0241 |
| | | | 705/14.66 |
| 2012/0259478 A1* | 10/2012 | Schuerman | G06F 3/0679 |
| | | | 701/1 |
| 2014/0128144 A1* | 5/2014 | Bavitz | A63F 13/217 |
| | | | 463/23 |
| 2014/0128145 A1* | 5/2014 | Hwang | A63F 13/00 |
| | | | 463/23 |
| 2014/0128146 A1* | 5/2014 | Story, Jr. | A63F 13/217 |
| | | | 463/36 |
| 2014/0244074 A1* | 8/2014 | Kowada | B60R 16/03 |
| | | | 701/2 |
| 2014/0256426 A1* | 9/2014 | Bavitz | A63F 13/65 |
| | | | 463/29 |
| 2015/0371253 A1* | 12/2015 | Hamilton, II | G06Q 30/0217 |
| | | | 705/14.19 |
| 2016/0071517 A1* | 3/2016 | Beaver | G06F 40/35 |
| | | | 704/9 |
| 2017/0154626 A1* | 6/2017 | Kim | G10L 15/22 |
| 2018/0121062 A1* | 5/2018 | Beaver | G06F 40/30 |
| 2019/0115008 A1* | 4/2019 | Jiang | G10L 15/22 |
| 2019/0122664 A1* | 4/2019 | Oikawa | G10L 25/54 |
| 2019/0138190 A1* | 5/2019 | Beaver | G06F 40/35 |
| 2019/0371303 A1* | 12/2019 | Siva Kumaran | G06N 20/00 |
| 2019/0392813 A1* | 12/2019 | Jiang | G10L 13/047 |
| 2020/0019642 A1* | 1/2020 | Dua | G06N 3/0472 |
| 2020/0175107 A1* | 6/2020 | Banerjee | G06F 40/30 |
| 2020/0211560 A1* | 7/2020 | Lei | H04M 3/50 |
| 2020/0327197 A1* | 10/2020 | Bhowal | G06N 5/041 |
| 2021/0097978 A1* | 4/2021 | Mei | G10L 15/1822 |
| 2021/0197832 A1* | 7/2021 | Matsunami | B60K 28/06 |
| 2021/0237757 A1* | 8/2021 | Nakano | G10L 15/22 |
| 2022/0005470 A1* | 1/2022 | Sugihara | H04R 1/406 |
| 2022/0062752 A1* | 3/2022 | Zeng | A63F 13/213 |

FOREIGN PATENT DOCUMENTS

| | | | | |
|---|---|---|---|---|
| CN | 204309741 U | * | 5/2015 | |
| CN | 108292317 A | * | 7/2018 | G10L 15/22 |
| CN | 109829038 A | * | 5/2019 | |
| CN | 110555098 A | * | 12/2019 | G06F 15/18 |
| CN | 106297785 B | * | 1/2020 | G10L 15/22 |
| CN | 110843796 A | * | 2/2020 | B60W 40/02 |
| CN | 111094924 A | * | 5/2020 | G06F 3/167 |
| CN | 112614491 A | * | 4/2021 | G10L 15/22 |
| CN | 112805182 A | * | 5/2021 | B60R 11/0217 |
| CN | 113206861 A | * | 8/2021 | B60W 50/14 |
| CN | 113505209 A | * | 10/2021 | |
| CN | 113646844 A | * | 11/2021 | A61B 5/167 |
| CN | 113990319 A | * | 1/2022 | |
| CN | 114372122 A | * | 4/2022 | |
| DE | 102021111109 A1 | * | 3/2022 | A63F 13/213 |
| EP | 2769884 A1 | * | 8/2014 | B60R 16/03 |
| EP | 2769884 B1 | * | 9/2016 | B60R 16/03 |
| GB | 2579440 A | * | 6/2020 | G06F 16/3344 |
| JP | 2001-141500 A | | 5/2001 | |
| JP | 2001141500 A | * | 5/2001 | |
| JP | 2005001643 A | * | 1/2005 | |
| JP | 2008162524 A | * | 7/2008 | |
| JP | 4483098 B2 | * | 6/2010 | |
| JP | 4958268 B2 | * | 6/2012 | |
| JP | 2019079345 A | * | 5/2019 | G06F 16/90332 |
| JP | 2021123133 A | * | 8/2021 | B60W 50/14 |
| WO | WO-2011026656 A1 | * | 3/2011 | G01C 21/26 |
| WO | WO-2014074634 A2 | * | 5/2014 | A63F 13/00 |
| WO | WO-2017090947 A1 | * | 6/2017 | G10L 15/22 |
| WO | WO-2020070878 A1 | * | 4/2020 | B60R 11/0217 |
| WO | WO-2020119031 A1 | * | 6/2020 | |

* cited by examiner

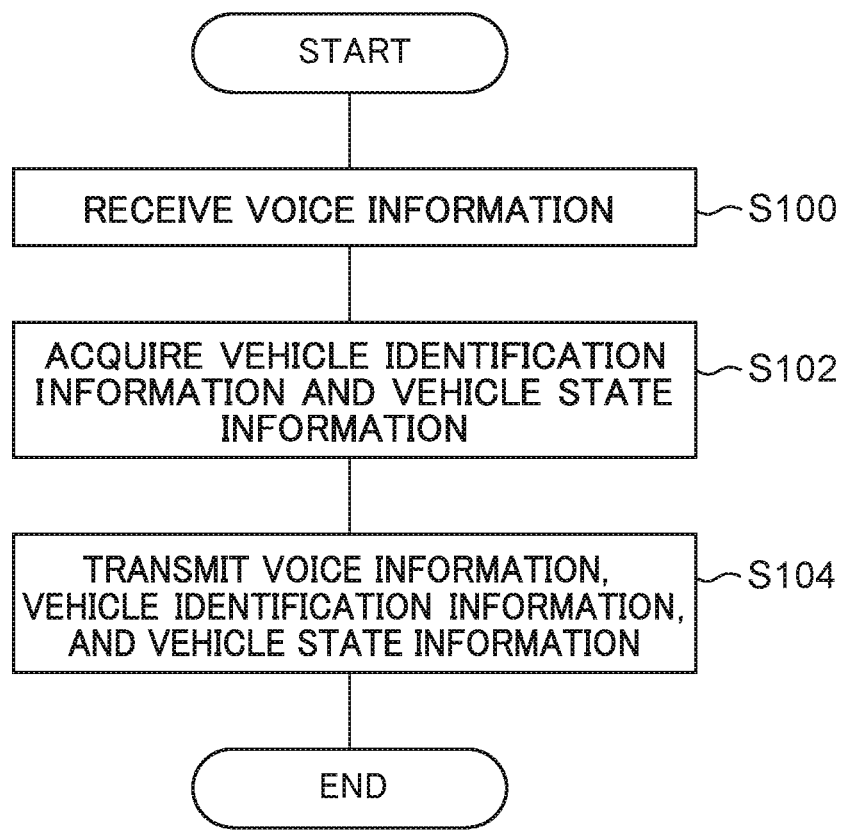

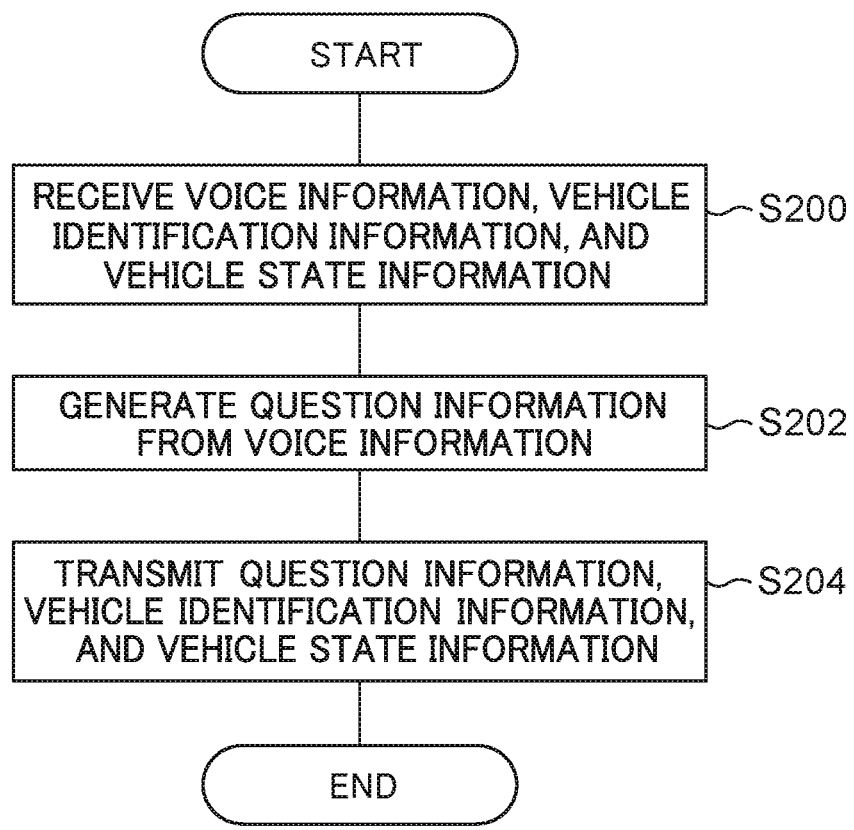

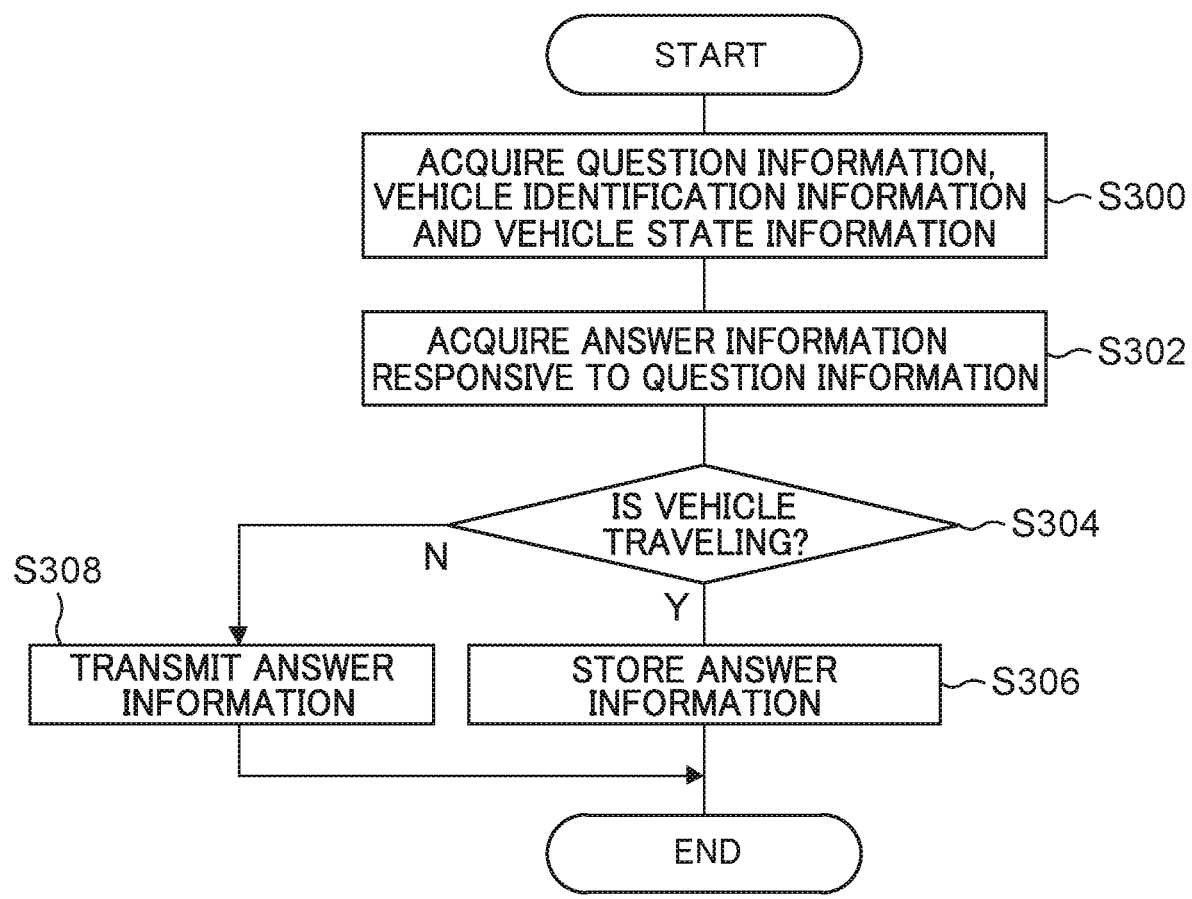

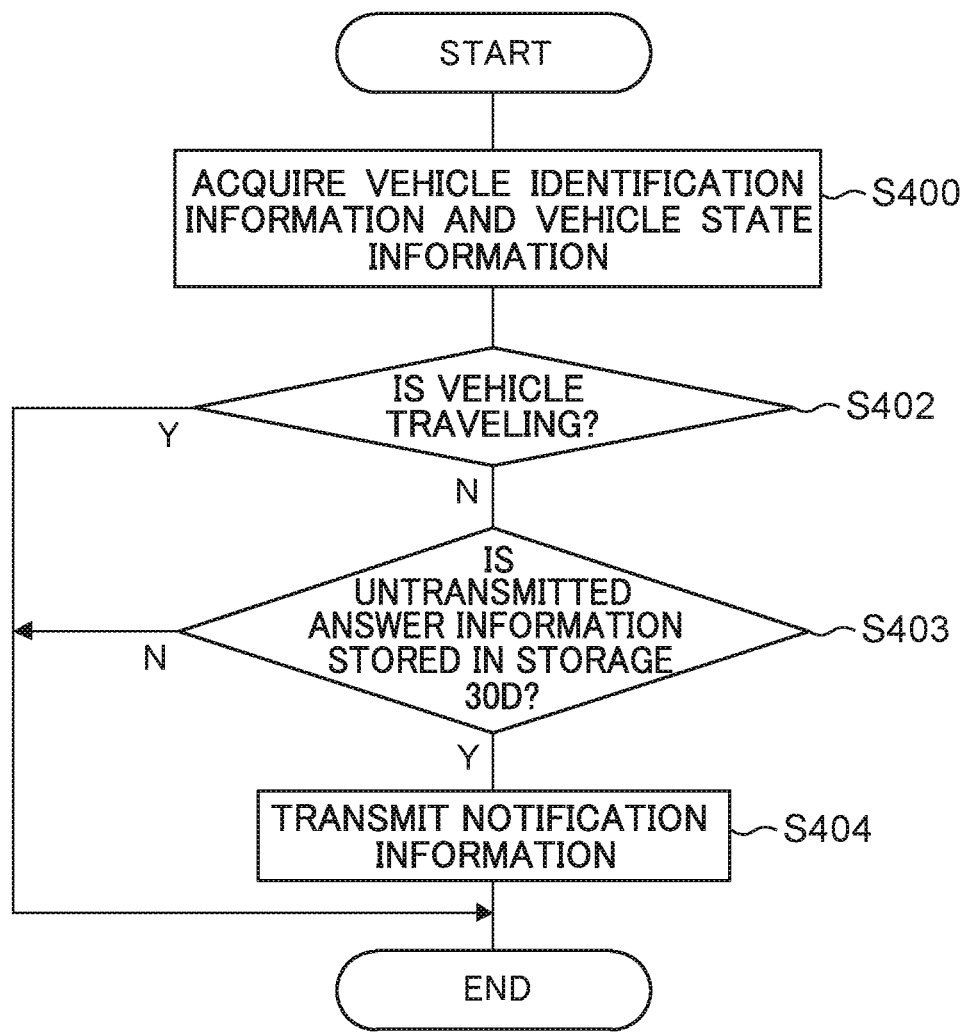

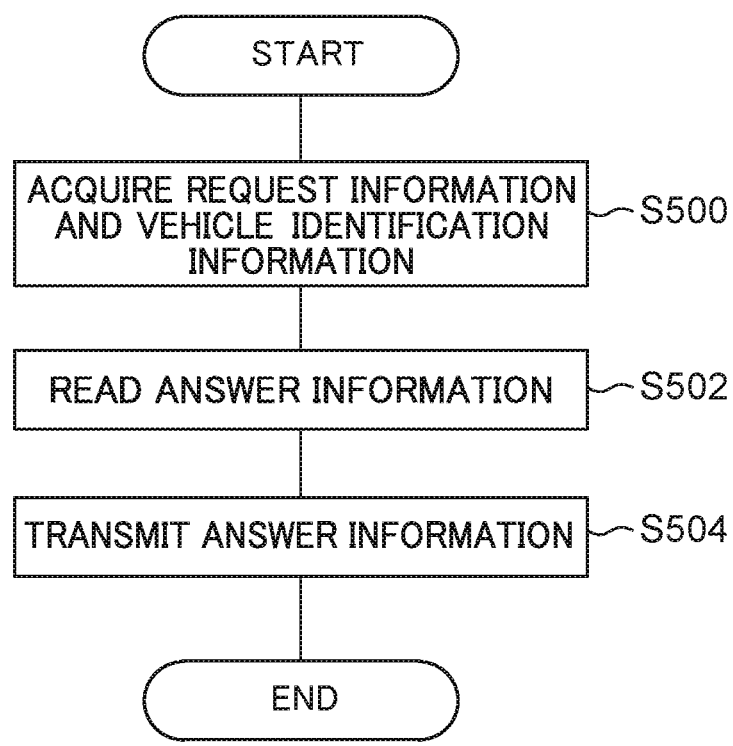

INFORMATION PROCESSING DEVICE, INFORMATION PROCESSING METHOD, AND STORAGE MEDIUM STORING INFORMATION PROCESSING PROGRAM

CROSS-REFERENCE TO RELATED APPLICATION

This application is based on and claims priority under 35 USC 119 from Japanese Patent Application No. 2020-15668 filed on Jan. 31, 2020, the disclosure of which is incorporated by reference herein.

BACKGROUND

Technical Field

The present disclosure relates to an information processing device, an information processing method, and a non-transitory storage medium storing an information processing program.

Related Art

Japanese Patent Application Laid-Open (JP-A) No. 2001-141500 discloses an agent processing device for vehicles that provides information related to operation of various onboard units. The agent processing device parses words, either after performing voice recognition of them when they are given as voice information including real voice or directly when they are given in an E-mail, and interprets their meaning. The agent processing device then picks out information related to operation of various onboard units in a vehicle from the words and summarizes it in a prioritized manner before outputting it from a speaker through voice synthesis.

SUMMARY

A situation is possible where an answer to a question made by an occupant of the vehicle is not given by voice but, for example, displayed on a monitor such as a car navigation device. In this case, the occupant of the vehicle will not be able to confirm the answer displayed on the monitor as an image while the vehicle is traveling because display on the monitor is restricted while the vehicle is traveling.

JP-A No. 2001-141500 only discloses that the agent processing device for vehicles disclosed therein outputs, through voice synthesis, information related to operation of various onboard units in the vehicle; as such, it does not consider displaying the information related to operation.

Thus, the technique in the related art is not capable of displaying an answer at an appropriate timing in response to a question made by an occupant of the vehicle during traveling of the vehicle.

In view of the above circumstances, the present disclosure aims to provide an information processing device, an information processing method, and a non-transitory storage medium storing an information processing program capable of displaying an answer at an appropriate timing in response to a question made by an occupant of the vehicle during traveling of the vehicle.

A first aspect of the present disclosure is an information processing device configured to output answer information responsive to question information from an occupant of a vehicle. The information processing device includes: a question acquisition section configured to acquire the question information; a vehicle state acquisition section configured to acquire vehicle state information representing a state of the vehicle; an answer acquisition section configured to acquire answer information responsive to the question information acquired by the question acquisition section, the answer information including an image for display; an answer control section configured to store the answer information acquired by the answer acquisition section in a storage section when the vehicle state information acquired by the vehicle state acquisition section represents that the vehicle is traveling; and an output section configured to output the answer information stored in the storage section when the vehicle state acquisition section acquires vehicle state information representing that the vehicle is stopped.

The information processing device of the first aspect acquires question information and acquires vehicle state information representing a state of the vehicle. The information processing device also acquires answer information including an image for display responsive to the question information. When the vehicle state information represents that that the vehicle is traveling, the information processing device stores the acquired answer information in a storage section. Upon acquiring vehicle state information representing that the vehicle is stopped, the information processing device outputs the answer information stored in the storage section. This allows an answer to be displayed at an appropriate timing in response to a question made by an occupant of the vehicle during traveling of the vehicle.

In a second aspect of the present disclosure, the output section of the information processing device is configured to output the answer information stored in the storage section when the vehicle state acquisition section acquires the vehicle state information representing that the vehicle is stopped after acquiring the vehicle state information representing that the vehicle is traveling. This allows the answer information to be outputted at an appropriate timing at which the traveling vehicle has come to a stop.

In a third aspect of the present disclosure, the output section of the information processing device is configured to output the answer information acquired by the answer acquisition section when the vehicle state acquisition section acquires the vehicle state information representing that the vehicle is stopped. This allows the answer information to be outputted in a usual manner while the vehicle is stopped.

In a fourth aspect of the present disclosure, the output section of the information processing device is configured to output the answer information after outputting notification information representing a notification about the answer information when the vehicle state acquisition section acquires the vehicle state information representing that the vehicle is stopped after acquiring the vehicle state information representing that the vehicle is traveling. This allows an occupant of the vehicle to, upon confirming the notification information, have the answer information displayed at an appropriate timing after the vehicle is stopped.

In a fifth aspect of the present disclosure, the output section of the information processing device is configured to determine whether the answer information is stored in the storage section when the vehicle state acquisition section acquires the vehicle state information representing that the vehicle is stopped after acquiring the vehicle state information representing that the vehicle is traveling, and is configured to output the notification information when the answer information is stored in the storage section. This allows the notification information to be outputted only when the answer information is stored in the storage section.

A sixth another aspect of the present disclosure is an information processing method executed by a computer of an information processing device configured to output answer information responsive to question information from an occupant of a vehicle. The method includes: acquiring the question information; acquiring vehicle state information representing a traveling state of the vehicle; acquiring answer information responsive to the acquired question information, the answer information including an image for display; storing the acquired answer information in a storage section when the acquired vehicle state information represents that the vehicle is traveling; and outputting the answer information stored in the storage section upon acquiring vehicle state information representing that the vehicle is stopped.

A seventh aspect of the present disclosure is a non-transitory computer-readable storage medium storing an information processing program executable by a computer of an information processing device configured to output answer information responsive to question information from an occupant of a vehicle. The program, when executed by the computer, causes the computer to perform a method including: acquiring the question information; acquiring vehicle state information representing a traveling state of the vehicle; acquiring answer information responsive to the acquired question information, the answer information including an image for display; storing the acquired answer information in a storage section when the acquired vehicle state information represents that the vehicle is traveling; and outputting the answer information stored in the storage section upon acquiring vehicle state information representing that the vehicle is stopped.

According to the above-described aspects of the present disclosure, it is possible to display an answer at an appropriate timing in response to a question made by an occupant during traveling of the vehicle.

BRIEF DESCRIPTION OF THE DRAWINGS

Exemplary embodiments of the present disclosure will be described in detail based on the following figures, wherein:

FIG. 7 shows an example of a processing routine executed by the onboard device according to the exemplary embodiment;

FIG. 8 shows an example of a processing routine executed by an HMI server according to the exemplary embodiment;

FIG. 9 shows an example of a processing routine executed by the agent server according to the exemplary embodiment;

FIG. 10 shows an example of a processing routine executed by the agent server according to the exemplary embodiment; and FIG. 11 shows an example of a processing routine executed by the agent server according to the exemplary embodiment.

DETAILED DESCRIPTION

Exemplary Embodiment

Figure 1:
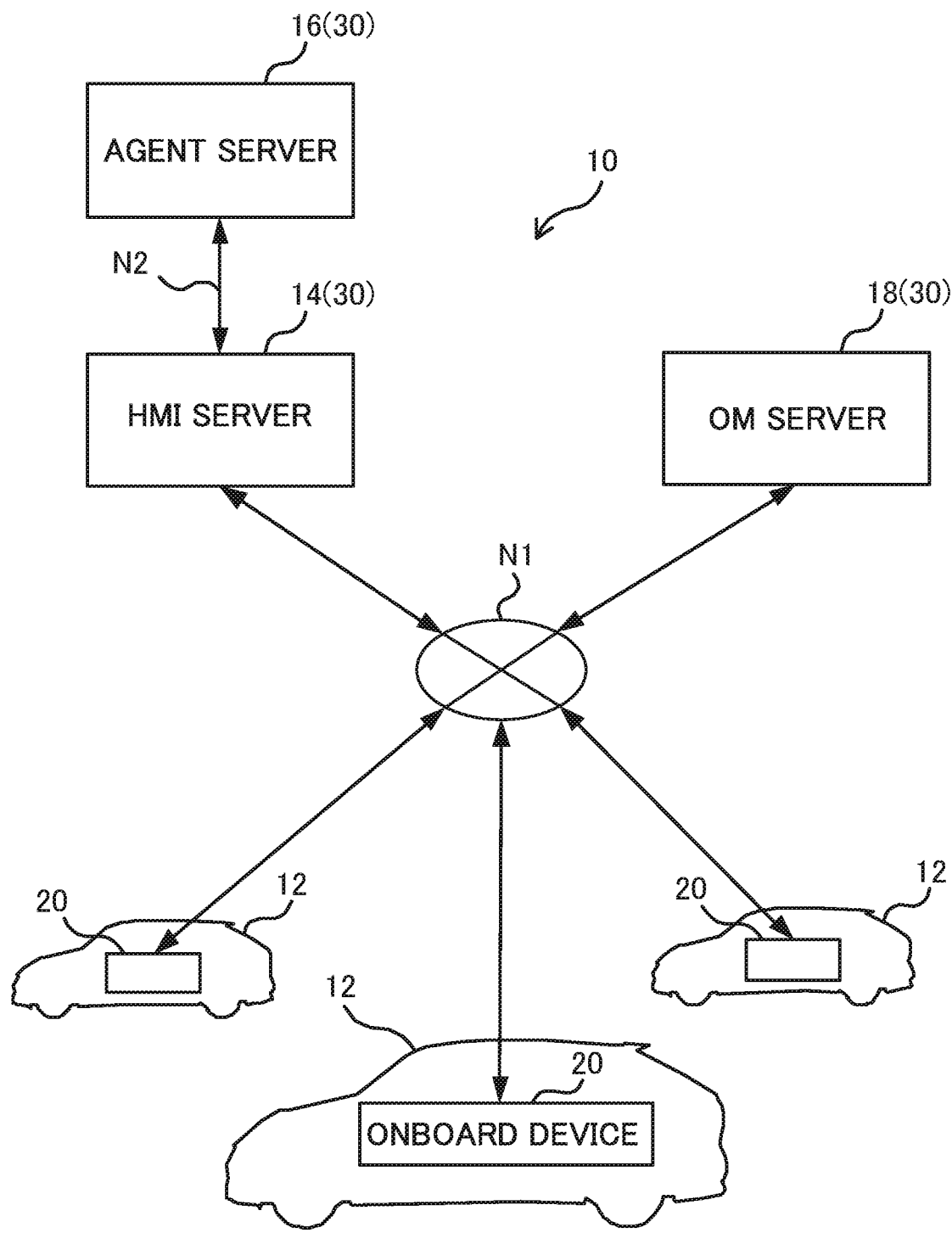
FIG. 1 is a block diagram showing an exemplary configuration of an information processing system according to an exemplary embodiment.

As shown in FIG. 1, an information processing system 10 of an exemplary embodiment includes multiple vehicles 12 and multiple servers 30. Each vehicle 12 is mounted with an onboard device 20 as an information providing device. The servers 30 include a human machine interface (hereinafter abbreviated "HMI") server 14 serving as an HMI, an agent server 16 as an example of the information processing device, and an owner's manual (hereinafter may be abbreviated as "OM") server 18. The owner's manual refers to an instruction book for the vehicle.

The onboard device 20 in each vehicle 12, the HMI server 14, and the OM server 18 are connected to each other via a network N1. The HMI server 14 and the agent server 16 are connected to each other via a network N2.

Vehicle

Figure 2:
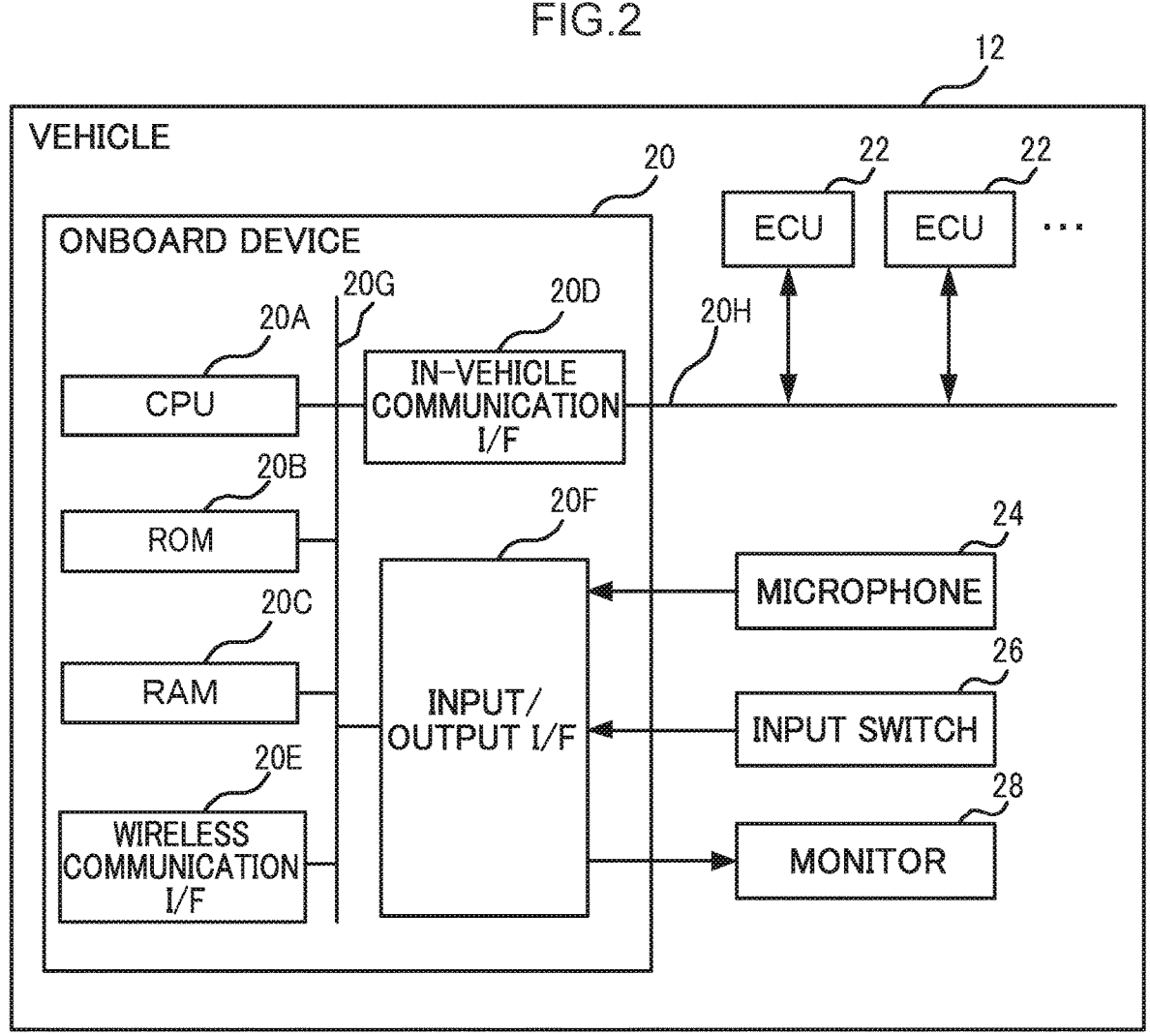
FIG. 2 is a block diagram showing an exemplary hardware configuration of an onboard device according to the exemplary embodiment.

As shown in FIG. 2, the vehicle 12 according to the present embodiment includes the onboard device 20, multiple ECUs 22, a microphone 24 as a voice input device, an input switch 26 as an operation input device, and a monitor 28 as a display device.

The onboard device 20 includes a central processing unit (CPU) 20A, a read only memory (ROM) 20B, a random access memory (RAM) 20C, an in-vehicle communication interface (I/F) 20D, a wireless communication I/F 20E, and an input/output I/F 20F. The CPU 20A, the ROM 20B, the RAM 20C, the in-vehicle communication I/F 20D, the wireless communication I/F 20E, and the input/output I/F 20F are communicatively connected to each other via an internal bus 20G.

The CPU 20A executes various programs and controls each section. Specifically, the CPU 20A loads programs from the ROM 20B and executes them on the RAM 20C as a working memory.

The ROM 20B stores various programs and data. The ROM 20B of the present embodiment stores a control program for controlling the onboard device 20.

As a working memory, the RANI 20C temporarily stores programs and data.

The in-vehicle communication I/F 20D is an interface for connection with the ECUs 22. The interface uses a CAN protocol-based communication standard. The in-vehicle communication I/F 20D is connected to an external bus 20H. The ECUs 22 are provided for respective functions of the vehicle 12. Examples of the ECUs 22 of the present embodiment include a vehicle control ECU, an engine ECU, a brake ECU, a body ECU, a camera ECU, and a multimedia ECU.

The wireless communication I/F 20E is a wireless communication module for communication with the servers 30. The wireless communication module uses a communication standard such as 5G, LTE, and Wi-Fi®. The wireless communication I/F 20E is connected to the network N1.

The input/output I/F 20F is an interface for communication with the microphone 24, the input switch 26, and the monitor 28 installed in the vehicle 12.

The microphone 24 is a device installed in a front pillar, a dashboard, and the like of the vehicle 12 to collect voice of occupants.

The input switch 26 is a switch installed in a center console, a steering wheel, and the like and through which an occupant can input operations with his/her fingers. The input switch 26 may be a push button numeric keypad or a touch pad, for example.

The monitor 28 is a liquid crystal monitor installed in the center console or a meter panel for displaying the owner's manual and answer information and notification information (described later). The monitor 28 may be provided in the form of a touch panel combined with the input switch 26.

Server

Figure 3:
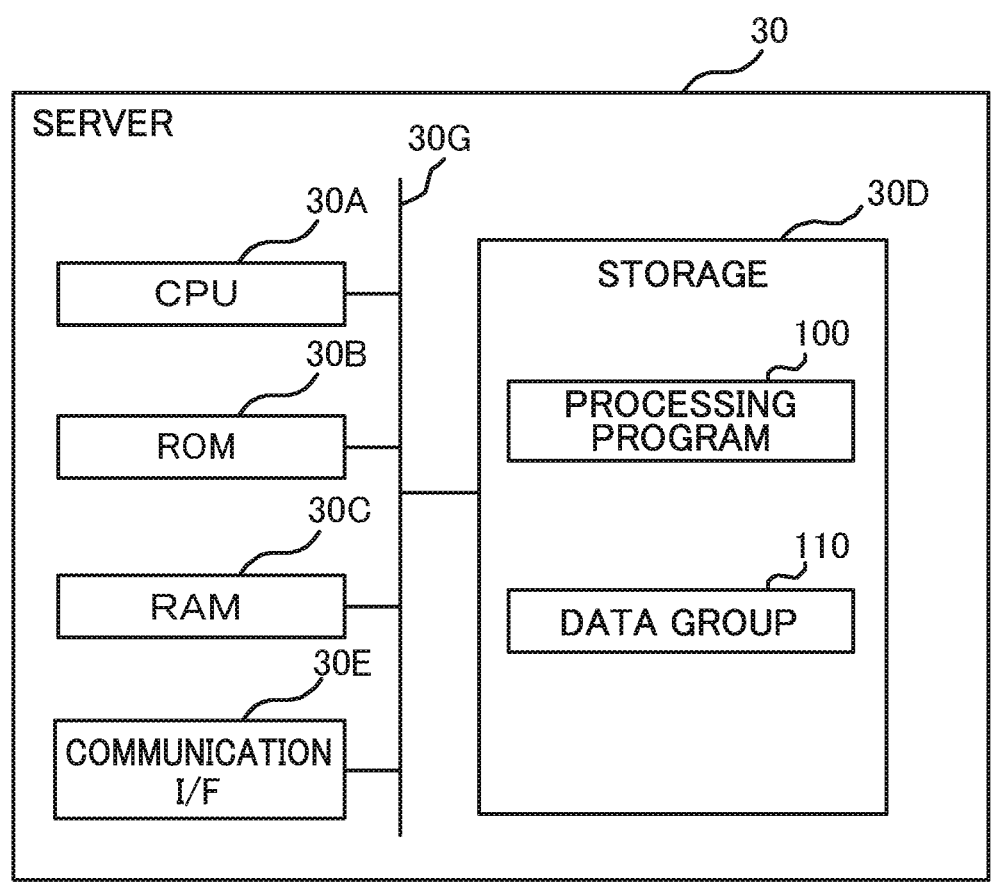
FIG. 3 is a block diagram showing an exemplary hardware configuration of a server according to the exemplary embodiment.

As shown in FIG. 3, each server 30 includes a CPU 30A, a ROM 30B, a RAM 30C, a storage 30D, and a communication I/F 30E. The CPU 30A, the ROM 30B, the RAM 30C, the storage 30D, which is an example of the storage section, and the communication I/F 30E are communicatively connected to each other via an internal bus 30G. The CPU 30A, the ROM 30B, the RAM 30C, and the communication I/F 30E have the same functions as the CPU 20A, the ROM 20B, the RANI 20C, and the wireless communication I/F 20E, respectively, of the above onboard device 20.

The storage 30D is composed of a hard disk drive (HDD) or a solid state drive (SSD) and stores various programs and data.

The CPU 30A loads programs from the storage 30D and executes them on the RAM 30C as a working memory.

The storage 30D of the present embodiment stores a processing program 100 and a data group 110. The processing program 100 is a program for implementing various functions of the server 30.

HMI Server

The HMI server 14 has a function of accepting questions from the onboard devices 20 and querying the agent server 16 for answers to questions about the owner's manual.

Figure 4:
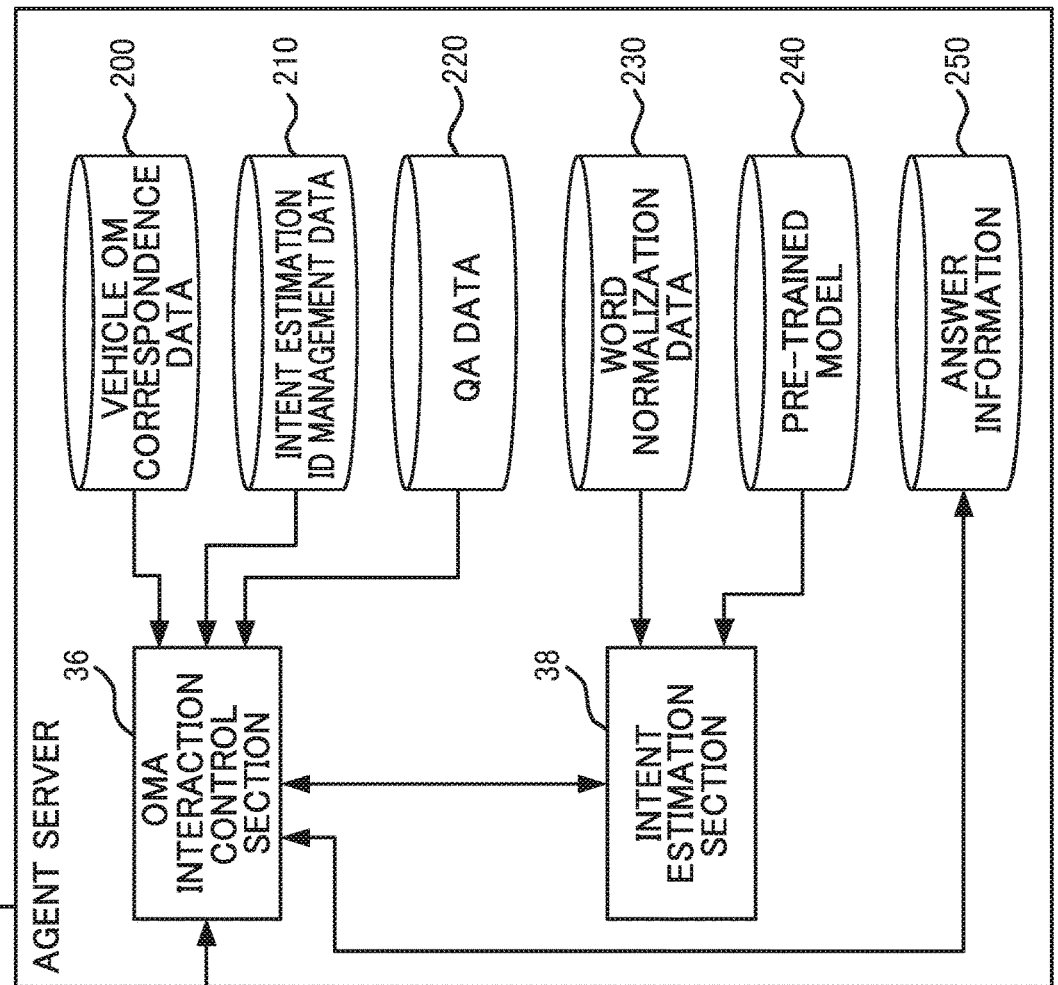
FIG. 4 is a block diagram showing an exemplary functional configuration of the information processing system according to the exemplary embodiment.

In the HMI server 14 of the present embodiment, the CPU 30A executes the processing program 100 to function as an HMI interaction control section 32 as shown in FIG. 4.

The HMI interaction control section 32 communicates with each onboard device 20. The HMI interaction control section 32 acquires voice information of an occupant of the vehicle 12 transmitted from the onboard device 20, performs voice recognition, and converts the voice information into text information. The HMI interaction control section 32 also acquires, from the onboard device 20, vehicle identification information that represents identification information about the vehicle 12 and vehicle state information that represents a state of the vehicle 12. The vehicle identification information represents a body number, a model, a grade, equipment, etc. of the vehicle 12. The vehicle state information represents whether the vehicle 12 is traveling or stopped.

Also, the HMI interaction control section 32 understands an intent of an occupant's speech based on the converted text information. When the HMI interaction control section 32 understands that the occupant has made a question about the owner's manual, the HMI interaction control section 32 queries the agent server 16 about the question.

In this case, the HMI interaction control section 32 uses the text information, which is obtained from the occupant's voice information, as question information. The HMI interaction control section 32 transmits a combination of the vehicle identification information, the vehicle state information, and the question information transmitted from the onboard device 20 to the agent server 16.

Agent Server

The agent server 16 functions as an agent (owner's manual agent; hereinafter abbreviated as "OMA") that handles questions about the owner's manual. The agent server 16 acquires the vehicle identification information, the vehicle state information, and the question information transmitted from the HMI server 14. In a process described later, the agent server 16 transmits answer information representing an answer to the question information or notification information representing a notification of the answer information to the onboard device 20 via the HMI server 14.

Figure 5:
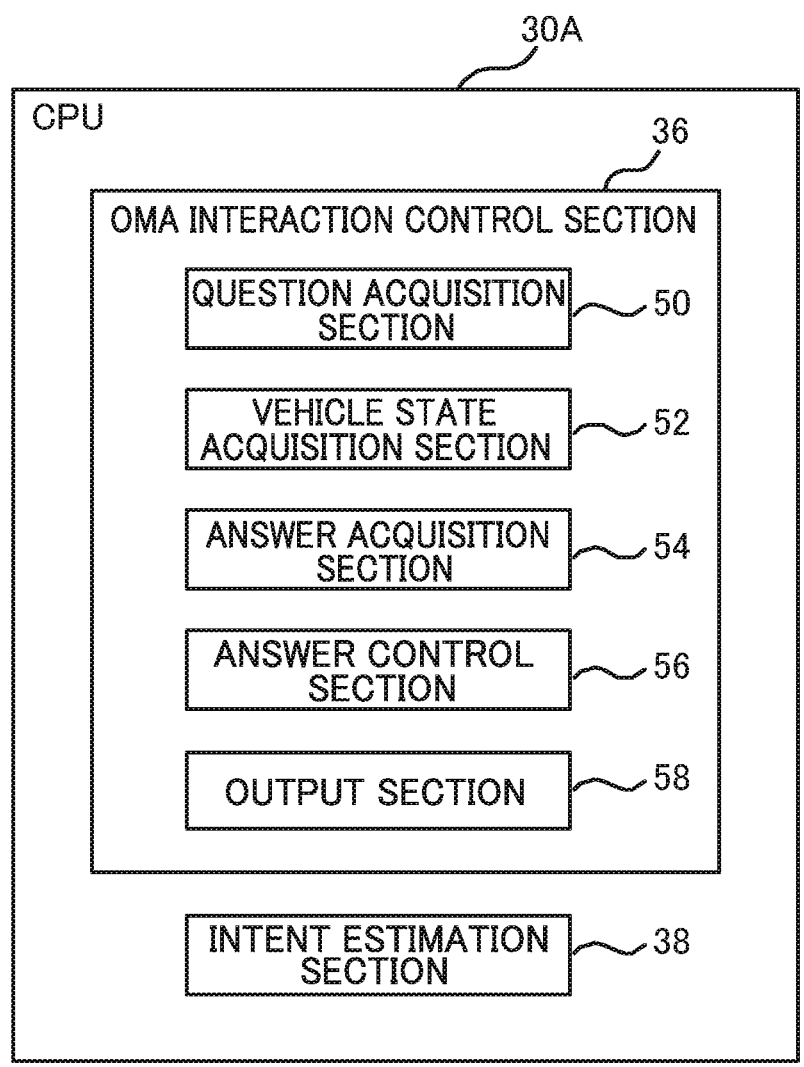
FIG. 5 is a block diagram showing an exemplary functional configuration of an agent server according to the exemplary embodiment.

In the agent server 16 of the present embodiment, the CPU 30A executes the processing program 100 to function as an OMA interaction control section 36 and an intent estimation section 38 shown in FIG. 5.

As shown in FIG. 5, the OMA interaction control section 36 includes a question acquisition section 50, a vehicle state acquisition section 52, an answer acquisition section 54, an answer control section 56, and an output section 58.

The data group 110 of the agent server 16 includes vehicle OM correspondence data 200, intent estimation ID management data 210, QA data 220, word normalization data 230, a pre-trained model 240, and answer information 250.

The vehicle OM correspondence data 200 store correspondence between the vehicle identification information, which represents a body number, a model, a grade, equipment, etc. of the vehicle 12, and an OM part number given to each owner's manual.

The intent estimation ID management data 210 manages the OM part numbers and intent estimation engine IDs corresponding to the respective OM part numbers. The intent estimation engine ID is an ID given to each intent estimation engine that executes intent estimation processing (described later). Each intent estimation engine is provided for similar or related owner's manuals.

The QA data 220 stores answer candidate information associated with an intent label given to each answer. Here, the intent label refers to a label number provided as a result of estimating an occupant's intent from his/her speech. The answer candidate information contains a text for display pertaining to an answer to a question, an image for display, a reading text, an URL for display of an owner's manual, etc.

The word normalization data 230 are data for normalizing words used in preprocessing for intent estimation. Here, the preprocessing refers to processing whereby variations in descriptions and expressions are standardized. For example, the word normalization data 230 includes data that represent that "off" and "OFF" are the same word and in which such variations in description are standardized. Also for example, the word normalization data 230 includes data that represent that a phrase "tire air pressure warning indicator light" and a phrase "air pressure warning indicator light" mean the same thing and in which such variations in expression are standardized.

The pre-trained model 240 is data generated by machine learning with training data that use text information pertaining to multiple phrases associated with a particular question as inputs and an intent label pertaining to an answer to the question as outputs. The pre-trained model 240 is prepared in advance for each OMA intent estimation engine.

The answer information 250 is data selected from the QA data 220 by the answer acquisition section 54 (described later). The answer information 250 of the present embodiment includes an image for display. The answer information 250 will be detailed later.

The question acquisition section 50 of the OMA interaction control section 36 acquires question information transmitted from the HMI server 14. The vehicle state acquisition section 52 of the OMA interaction control section 36 acquires the vehicle identification information and the vehicle state information transmitted from the HMI server 14.

The answer acquisition section 54 of the OMA interaction control section 36 acquires answer information 250 including an image for display responsive to the question information acquired by the question acquisition section 50.

Specifically, the answer acquisition section 54 refers to the vehicle OM correspondence data 200 based on the vehicle identification information acquired by the vehicle state acquisition section 52 to acquire an OM part number corresponding to the vehicle 12 using the vehicle identification information about the vehicle 12. When the answer acquisition section 54 fails to acquire an OM part number, a notification indicating "Not covered by the service" is issued from the output section 58 (described later) to the HMI interaction control section 32. The answer acquisition section 54 also refers to the intent estimation ID management data 210 to acquire an OMA intent estimation engine ID to be applied to the vehicle 12 using the acquired OM part number.

The answer acquisition section 54 then queries the intent estimation section 38 using the question information and the OMA intent estimation engine ID as input values to acquire an intent label corresponding to an answer. When no intent label is retrievable, "no-match" information representing that there is no match is transmitted from the output section 58 (described later) to the HMI interaction control section 32.

On the other hand, when the answer acquisition section 54 acquires one intent label, the answer acquisition section 54 then refers to the QA data 220 to acquire corresponding answer information based on the acquired intent label and OM part number.

Display on the monitor 28 of the vehicle 12 is restricted while the vehicle 12 is traveling, and accordingly the answer information 250 including an image for display is not displayed thereon. Thus, the occupant of the vehicle 12 is unable to confirm the image for display contained in the answer information 250 while the vehicle 12 is traveling.

In view of this, when the vehicle 12 is traveling, the agent server 16 of the present embodiment temporality stores the answer information 250 acquired by the answer acquisition section 54 in the storage 30D. And when the vehicle state information transmitted from the vehicle 12 changes from a traveling state to a stopped state, the agent server 16 outputs notification information representing a notification of the answer information 250 to the onboard device 20 via the HMI server 14. This allows the occupant to confirm, at the timing when the vehicle 12 has stopped, the notification information about the answer information 250 responsive to the question information and confirm the answer information 250 including the image for display.

Specifically, when the vehicle state information acquired by the vehicle state acquisition section 52 represents that the vehicle 12 is traveling, the answer control section 56 of the OMA interaction control section 36 stores the answer information 250 acquired by the answer acquisition section 54 in the storage 30D (described later). Thus, the answer information 250 including the image for display responsive to the question information acquired during traveling of the vehicle 12 is temporarily stored in the storage 30D.

When the traveling vehicle 12 has come to a stop, the output section 58 outputs the notification information (a so-called push notification) about the answer information 250 stored in the storage 30D to the onboard device 20 via the HMI server 14.

Specifically, when the vehicle state acquisition section 52 acquires the vehicle state information representing that the vehicle 12 is stopped after acquiring the vehicle state information representing that the vehicle 12 is traveling, the output section 58 outputs the notification information about the answer information 250 stored in the storage 30D.

Figure 6:
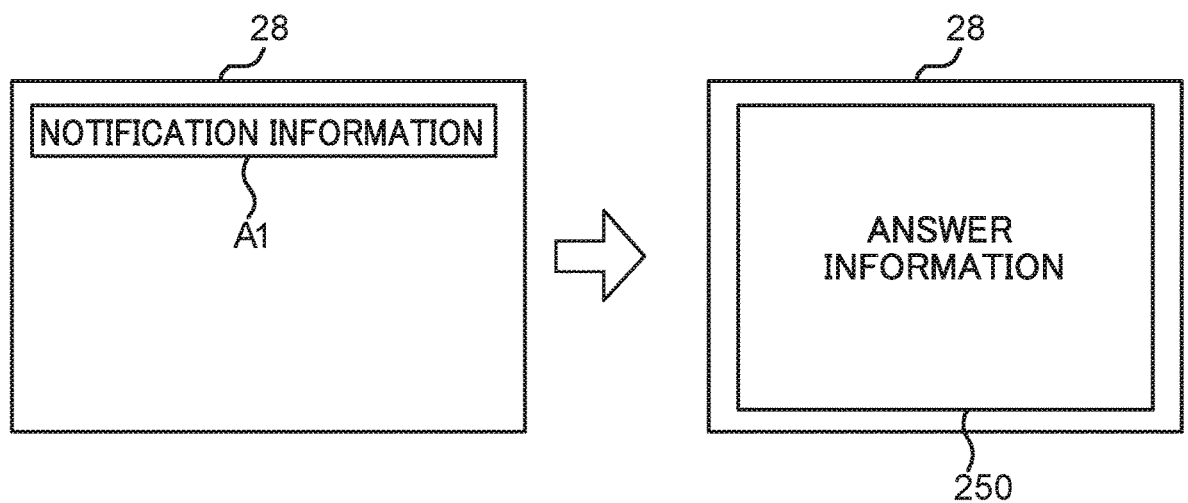
FIG. 6 shows an example of notification information and answer information.

For example, when the traveling vehicle 12 has come to a stop, notification information A1 as shown in FIG. 6 is displayed on the monitor 28 of the vehicle 12 as a result of the agent server 16 transmitting the notification information. In response to the driver selecting the notification information A1 via the touch panel for example, the answer information 250 corresponding to the notification information A1 is displayed on the monitor 28. The driver selects the notification information A1 displayed on the monitor 28 and confirms the content of the answer information 250 including the displayed image. This allows the driver of the vehicle 12 to confirm the answer information 250 including the image for display at the timing when the vehicle 12 is stopped.

When the vehicle state information acquired by the vehicle state acquisition section 52 represents that the vehicle 12 is stopped, the output section 58 directly outputs the answer information 250 acquired by the answer acquisition section 54.

The output section 58 of the OMA interaction control section 36 transmits any one of the "no-match" information, the answer information 250 including the image for display, and the notification information to the onboard device 20 via the HMI interaction control section 32.

The intent estimation section 38 executes intent estimation processing whereby the intent estimation section 38 acquires an intent label using an intent estimation engine corresponding to the intent estimation engine ID and provides the label to the OMA interaction control section 36. Specifically, the following processing is executed in the intent estimation processing.

First, the intent estimation section 38 performs preprocessing on the text in the acquired text information, whereby variations in description and expression are standardized.

Then, the intent estimation section 38 inputs the text information having undergone the preprocessing to the pre-trained model 240 prepared for each intent estimation engine and thereby outputs the intent label and its degree of confidence. The degree of confidence refers to the probability of the text information input to the pre-trained model 240 being the estimated intent label.

The intent estimation section 38 provides, to the OMA interaction control section 36, the intent label whose degree of confidence exceeds a certain value, namely, whose reliability is surely above a certain probability level.

OM Server

The OM server 18 is one of the servers 30 that provides the owner's manual. The data group 110 in the OM server 18 includes OM data 300 that are HTML data of the owner's manual. When the occupant selects an URL included in the image pertaining to the answer information 250 and the notification information displayed on the monitor 28 of the vehicle 12, a request for transmission of HTML data corresponding to the URL is made to the OM server 18. Thus, the HTML data of the owner's manual corresponding to the URL is transmitted to the onboard device 20 and displayed on the monitor 28.

Control Flow

An exemplary process flow executed in the information processing system 10 of the present embodiment will be described below with reference to flowcharts of FIGS. 7 to 11.

When the occupant of the vehicle 12 asks a question by voice, the microphone 24 of the vehicle 12 acquires that voice. Upon the microphone 24 acquiring the voice information, the CPU 20A of the onboard device 20 executes a processing routine shown in FIG. 7.

At step S100, the CPU 20A of the onboard device 20 receives the voice information acquired by the microphone 24.

At step S102, the CPU 20A of the onboard device 20 acquires the vehicle state information representing a traveling state of the vehicle 12, which is sequentially detected by the ECU 22. At step S102, the CPU 20A of the onboard device 20 also acquires the vehicle identification information from a certain storage section (not shown) in the onboard device 20.

At step S104, the CPU 20A of the onboard device 20 performs control to transmit, to the HMI server 14 via the wireless communication I/F 20E, the occupant's voice information acquired at step S100 and the vehicle identification information and the vehicle state information about the vehicle 12 acquired at step S102.

Upon the above information being transmitted from the onboard device 20, the HMI server 14 executes a process routine shown in FIG. 8.

At step S200, the HMT interaction control section 32 of the HMT server 14 receives the occupant's voice information and the vehicle identification information and the vehicle state information about the vehicle 12 transmitted from the onboard device 20.

At step S202, the HMI interaction control section 32 performs voice recognition on the voice information of the occupant of the vehicle 12 transmitted from the onboard device 20 and coverts the voice information into text information. When the HMI interaction control section 32 understands an intent in the text information obtained from the occupant's voice information, the HMI interaction control section 32 generates question information based on the text information.

At step S204, the HMI interaction control section 32 of the HMI server 14 transmits, to the agent server 16, the question information generated at step S202 and the vehicle identification information and the vehicle state information received at step S200.

Upon receiving the question information, the vehicle identification information, and the vehicle state information transmitted from the HMI server 14, the agent server 16 executes a process routine shown in FIG. 9.

At step S300, the question acquisition section 50 of the OMA interaction control section 36 acquires the question information transmitted from the HMI server 14. Also at step S300, the vehicle state acquisition section 52 of the OMA interaction control section 36 acquires the vehicle identification information and the vehicle state information transmitted from the HMI server 14.

At step S302, the answer acquisition section 54 of the OMA interaction control section 36 acquires answer information 250 including an image for display responsive to the question information acquired by the question acquisition section 50.

At step S304, the answer control section 56 of the OMA interaction control section 36 determines whether the vehicle 12 is traveling or not, based on the vehicle state information acquired at step S300. If the vehicle state information represents that the vehicle 12 is traveling, the process goes to step S306. If the vehicle state information represents that the vehicle 12 is stopped, the process goes to step S308.

At step S306, the answer control section 56 stores the answer information 250 acquired at step S302 in the storage 30D.

At step S308, the output section 58 transmits the answer information 250 acquired at step S302 to the onboard device 20 via the HMI server 14.

If the vehicle 12 is determined to be traveling at step S304 and the untransmitted answer information is stored in the storage 30D, the agent server 16 repeatedly executes a process routine shown in FIG. 10.

At step S400, the vehicle state acquisition section 52 of the OMA interaction control section 36 acquires the vehicle identification information and the vehicle state information about the vehicle 12 via the HMI server 14.

At step S402, the output section 58 determines whether the vehicle 12 is still traveling or not, based on the vehicle state information acquired at step S400. If the vehicle state information represents that the vehicle 12 is traveling, the process routine shown in FIG. 10 ends. If the vehicle state information represents that the vehicle 12 is stopped, the process goes to step S403.

At step S403, the output section 58 determines whether any untransmitted answer information is stored in the storage 30D or not. If untransmitted answer information is stored in the storage 30D, the process goes to step S404. If no untransmitted answer information is stored in the storage 30D, the process routine ends.

At step S404, the output section 58 transmits notification information to the onboard device 20 via the HMI server 14.

Upon receipt of the notification information transmitted from the agent server 16, the CPU 20A of the onboard device 20 displays the notification information on the monitor 28. The occupant of the vehicle 12 confirms the notification information displayed on the monitor 28 and gets notified of an incoming answer to the question that he/she made during traveling of the vehicle 12. Via a touch pad, which is an example of the input switch 26, and the like, the occupant of the vehicle 12 then selects the notification information to input request information requesting the answer information 250 including the image for display.

In response to input of the request information by the occupant of the vehicle 12, the CPU 20A of the onboard device 20 transmits the request information and the vehicle identification information to the agent server 16 via the HMI server 14.

Upon receipt of the request information and the vehicle identification information transmitted from the onboard device 20, the agent server 16 executes a process routine shown in FIG. 11.

At step S500, the output section 58 acquires the request information and the vehicle identification information transmitted from the onboard device 20.

At step S502, the output section 58 reads from the storage 30D the answer information 250 corresponding to the request information and the vehicle identification information acquired at step S500.

At step S504, the output section 58 transmits the answer information 250 read at step S502 to the onboard device 20 via the HMI server 14. The answer information 250 includes the image for display.

Upon receipt of the answer information 250 transmitted from the agent server 16, the CPU 20A of the onboard device 20 displays the answer information 250 on the monitor 28. The occupant of the vehicle 12 confirms the answer information 250 displayed on the monitor 28 and thus confirms the answer to the question that he/she made during traveling of the vehicle 12. When, for example, the occupant selects an URL included in the image for display of the answer information 250, a request for transmission of HTML data corresponding to the URL is made to the OM server 18. Thus, the HTML data of the owner's manual corresponding to the selected URL is transmitted to the onboard device 20 and displayed on the monitor 28.

As described above, the agent server according to the exemplary embodiment acquires the question information from the occupant of the vehicle and acquires the vehicle state information representing a state of the vehicle. The agent server acquires the answer information including the image for display responsive to the question information and, when the vehicle state information represents that the vehicle is traveling, stores the acquired answer information in the storage. Upon acquiring the vehicle state information representing that the vehicle is stopped, the agent server outputs the answer information stored in the storage. This allows the answer to be displayed at an appropriate timing in response to the question made by the occupant of the vehicle during traveling of the vehicle.

Also, when the agent server acquires the vehicle state information representing that the vehicle is stopped after acquiring the vehicle state information representing that the vehicle is traveling, the agent server outputs the notification information about the answer information. This allows the occupant to obtain the answer information by his/her operation following instructions on the monitor after the vehicle is stopped. Thus, the answer information can be displayed at an appropriate timing after the vehicle is stopped, giving convenience to occupants of the vehicle.

It should be noted that while the processing performed by each device in the above exemplary embodiment has been described as software processing that is implemented by a computer executing a program, the processing may be implemented in hardware. Alternatively, the processing may be implemented in a combination of software and hardware. Also, the program stored in the ROM may be stored in various types of storage media and distributed.

It will be apparent that the present disclosure is not limited to the above exemplary embodiment and may be modified in various ways without departing from the scope of the present disclosure.

For example, while in the above exemplary embodiment the notification information and the answer information 250 are displayed on the monitor 28 of the vehicle 12, this is by way of example only and not of limitation. Alternatively, at least one of the notification information and the answer information may be displayed on a smartphone of an occupant of the vehicle 12. For example, in a possible configuration, the notification information may be displayed on the smartphone of the occupant and the answer information may be displayed on the monitor 28 of the onboard device 20.

While in the above embodiment the answer information is outputted after the notification information is outputted, this is by way of example only and not of limitation. Alternatively, the answer information may be outputted without the notification information being outputted.

The disclosures of Japanese Patent Application No. 2020-15668 filed on Jan. 31, 2020 are incorporated herein by reference in their entirety.

All publications, patent applications, and technical standards mentioned in this specification are herein incorporated by reference to the same extent as if each individual publication, patent application, or technical standard was specifically and individually indicated to be incorporated by reference.

What is claimed is:

1. An information processing device configured to output answer information in response to question information from an occupant of a vehicle, the information processing device comprising:
   a memory; and
   a processor coupled to the memory, wherein the processor is configured to:
      acquire question information;
      acquire vehicle state information representing a state of the vehicle;
      acquire answer information in response to the question information, the answer information including an image for display, wherein the answer information is acquired at least by using machine learning with training data that use text information pertaining to multiple phrases associated with a particular question of the acquired question information as inputs and an intent label pertaining to an answer to the question as outputs, wherein the intent label includes a degree of confidence associated with a probability that exceeds a certain threshold value;
      in a case in which the vehicle state info (nation represents that the vehicle is traveling, store the answer information in a storage; and
      in a case in which the processor acquires vehicle state information representing that the vehicle is stopped, output the answer information stored in the storage to the occupant.

2. The information processing device of claim 1, wherein, in a case in which the processor acquires the vehicle state information representing that the vehicle is stopped after acquiring the vehicle state information representing that the vehicle is traveling, the processor is configured to output the answer information stored in the storage.

3. The information processing device of claim 1, wherein, in a case in which the vehicle state information represents that the vehicle is stopped, the processor is configured to output the answer information.

4. The information processing device of claim 1, wherein, in a case in which the processor acquires the vehicle state information representing that the vehicle is stopped after acquiring the vehicle state information representing that the vehicle is traveling, the processor is configured to output the answer information after outputting notification information representing a notification about the answer information.

5. The information processing device of claim 4, wherein the processor is configured to determine whether the answer information is stored in the storage, and is configured to output the notification information in a case in which the answer information is stored in the storage.

6. An information processing method executed by an information processing device including a memory and a processor coupled to the memory and configured to output answer information in response to question information from an occupant of a vehicle, the method comprising:
   acquiring question information;
   acquiring vehicle state information representing a traveling state of the vehicle;
   acquiring answer information in response to the question information, the answer information including an image for display, wherein the answer information is acquired at least by using machine learning with training data that use text information pertaining to multiple phrases associated with a particular question of the acquired question information as inputs and an intent label pertaining to an answer to the question as outputs, wherein the intent label includes a degree of confidence associated with a probability that exceeds a certain threshold value;

in a case in which the acquired vehicle state information represents that the vehicle is traveling, storing the acquired answer information in a storage; and in a case in which the processor acquires vehicle state information representing that the vehicle is stopped, outputting the answer information stored in the storage to the occupant.

7. A non-transitory computer-readable storage medium storing an information processing program executable by a computer of an information processing device including a memory and a processor coupled to the memory and configured to output answer information in response to question information from an occupant of a vehicle, the program, when executed by the computer, causing the computer to perform a method comprising:

acquiring question information;

acquiring vehicle state information representing a traveling state of the vehicle;

acquiring answer information in response to the question information, the answer information including an image for display, wherein the answer information is acquired at least by using machine learning with training data that use text information pertaining to multiple phrases associated with a particular question of the acquired question information as inputs and an intent label pertaining to an answer to the question as outputs, wherein the intent label includes a degree of confidence associated with a probability that exceeds a certain threshold value;

in a case in which the acquired vehicle state information represents that the vehicle is traveling, storing the acquired answer information in a storage; and in a case in which the processor acquires vehicle state information representing that the vehicle is stopped, outputting the answer information stored in the storage to the occupant.

* * * * *